Figure 1:
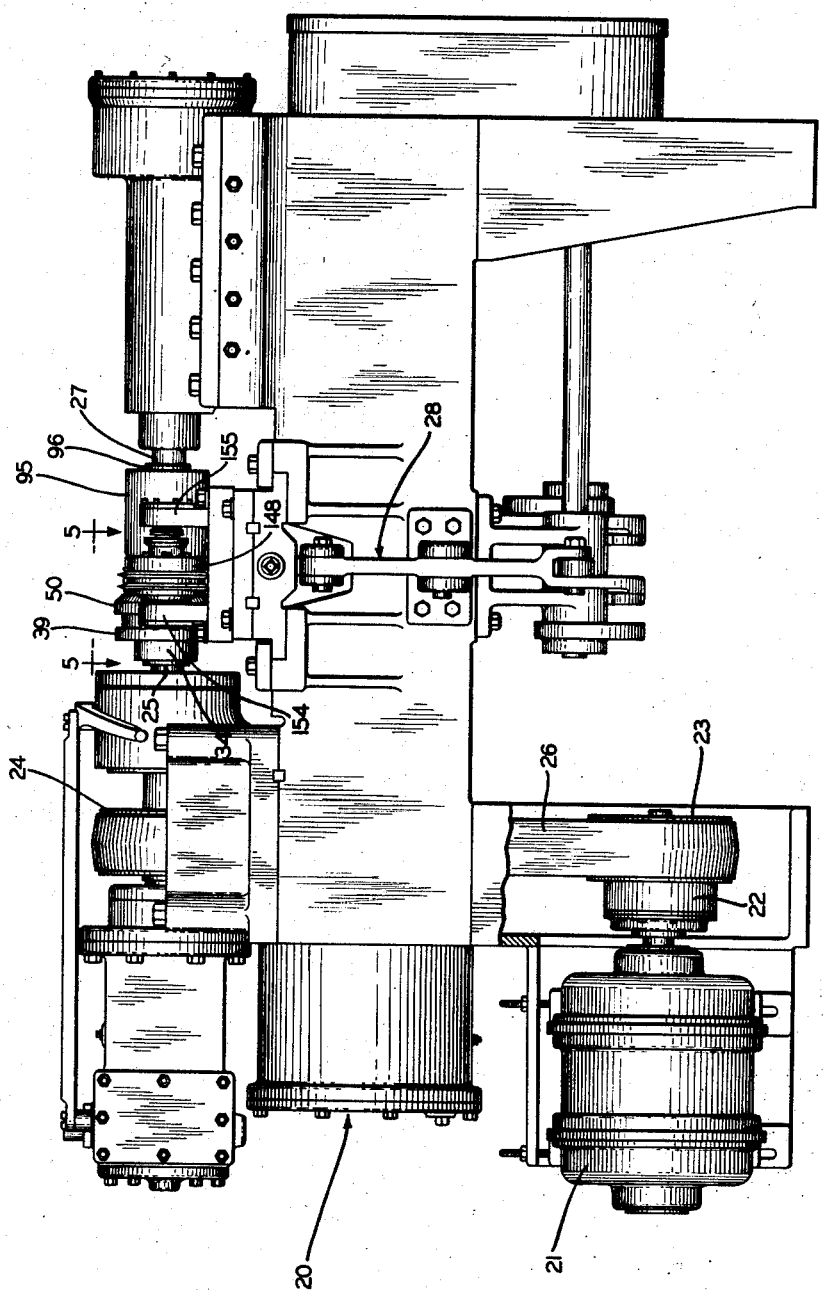

June 30, 1959    R. J. KILLIAN ET AL    2,892,431
APPARATUS FOR FORMING MULTI-GROOVE PULLEYS
Filed Feb. 17, 1955    7 Sheets-Sheet 3

INVENTORS
ROBERT J. KILLIAN and
GLENN M. BROWN
BY
Frease & Bishop
ATTORNEYS

June 30, 1959　　　R. J. KILLIAN ET AL　　　2,892,431
APPARATUS FOR FORMING MULTI-GROOVE PULLEYS
Filed Feb. 17, 1955　　　　　　　　　　　　　7 Sheets-Sheet 4

INVENTORS
ROBERT J. KILLIAN and
GLENN M. BROWN
BY
*Frease & Bishop*
ATTORNEYS

June 30, 1959 R. J. KILLIAN ET AL 2,892,431
APPARATUS FOR FORMING MULTI-GROOVE PULLEYS
Filed Feb. 17, 1955 7 Sheets-Sheet 5

INVENTORS
ROBERT J. KILLIAN and
GLENN M. BROWN
BY
*Frease & Bishop*
ATTORNEYS

June 30, 1959  R. J. KILLIAN ET AL  2,892,431
APPARATUS FOR FORMING MULTI-GROOVE PULLEYS
Filed Feb. 17, 1955  7 Sheets-Sheet 6

INVENTORS
ROBERT J. KILLIAN and
GLENN M. BROWN
BY
*Frease & Bishop*
ATTORNEYS

2,892,431

APPARATUS FOR FORMING MULTI-GROOVE PULLEYS

Robert J. Killian and Glenn M. Brown, Canton, Ohio, assignors to Automatic Steel Products, Inc., Canton, Ohio, a corporation of Delaware Application February 17, 1955, Serial No. 488,870

9 Claims. (Cl. 113—52)

Our invention relates to apparatus for forming multi-groove pulleys, and more specifically to apparatus for forming one-piece multi-groove pulleys by roller forming a series of parallel grooves in the pulleys. The present improvements in forming pulleys constitute improvements upon the methods and apparatus set forth in the Nelson Patent No. 1,680,061, the Harrison Patents Nos. 1,828,464 and 2,062,415 and the Wickwire et al. Patent No. 2,685,856.

Various forms and configurations of V-groove pulleys have been and are presently being used with V-cross-section belts as a power transmission means between prime movers and various devices to be driven thereby. One very common use of such a power transmission means is in an automobile, wherein a V-groove pulley or pulleys are mounted on the crankshaft of the automobile and are belted by means of V-belts to various sub-assemblies, such as generators, water pumps and cooling fans, which sub-assemblies are also provided with V-groove pulleys mounted thereon and driven by the V-belts.

In most applications using V-groove pulleys and V-belts, it is very essential that the grooves of the pulley are concentric with the axis about which the pulley rotates and also that these grooves are of uniform width at any particular diameter around the circumference of the pulley. If these V-grooves are out of concentricity and have variations in groove width around the circumference thereof, it may cause an uneven drive between the various V-groove pulleys and also may create considerable noise. Further, it may cause a decrease in the amount of power that can be transmitted thereby due to a decrease in the wedging action between the groove and belt. This becomes a very important factor, particularly in the modern day automobile, due to the higher speeds of the engines and the greater amounts of power to be transmitted by such V-groove pulley and V-belt assemblies.

Usually in automobiles, it has been necessary to provide a pulley or pulleys on the crankshaft of the automobile with a series of V-grooves, driven from the crankshaft and V-groove belts are received in these V-grooves; and each belt drives a separate sub-assembly or series of sub-assemblies. For instance, one V-belt may drive a generator and a first water pump, whereas a second V-belt may drive the cooling fan and a second water pump. The need for an increased number of V-belts and consequently, V-grooves, to be driven by the crankshaft has become more and more necessary with the advent of the various hydraulically actuated devices and the like on modern automobiles.

Prior constructions of V-groove pulleys have primarily consisted of a pulley having a single V-groove formed in an axially extending flange thereof, with a number of these pulleys being fastened together and mounted on the forward end of the crankshaft to provide the number of V-grooves required. With the increase in the number of V-grooves required, a problem has arisen both from the weight standpoint and from the expense of providing these numerous single V-groove pulleys. It is desired, to satisfy this need, to provide a single flange multi-groove pulley, that is, a pulley having a number of parallel V-grooves in the axially extending flange of the pulley. Such a pulley thus, may replace the two or more separate single groove pulleys, before required.

Some prior constructions of multi-groove pulleys have been formed from various stampings which are welded or brazed in assembled position to form a single multi-groove pulley. For instance, the flange or cup portion of the pulley and one of the flanges of the first groove may be formed of one piece, the second flange of the first groove and the first flange of the second groove may be formed in one piece, and so forth. These various parts are then assembled in place and the various flanges forming the grooves usually overlap at the bottom or lowest point of the groove forming a connecting portion. These connecting portions are then brazed or welded together to form the completed assembly.

One of the principal difficulties with such prior numerous piece assembly pulleys has been that the various pieces each require a number of stamping operations to form the part, and the parts must then be assembled together. Further, numerous operations are performed to join the parts in assembled position by brazing or welding, thereby making such construction very costly to manufacture.

A further difficulty with this prior construction is that it is very difficult to manufacture and assemble the various parts so that the various groove widths are uniform throughout and so that all grooves are concentric with the axis of the pulley about which the pulley rotates. This difficulty is further increased by the brazing or welding operations which may cause the various parts to warp, thereby aggravating the non-uniform width and out of concentricity conditions.

A still further difficulty with this type of construction is that the resulting groove forming metal walls are usually soft and frequently rough, due to the various manufacturing processes and particularly the heating required for the welding or brazing operations. The softness of the groove metal causes these groove forming metal walls to wear in use, still further aggravating the non-uniformity of width and out of concentricity conditions. Additionally, the roughness of the groove metal causes the V-belts received in such grooves to wear rapidly during use, requiring frequent replacement of these V-belts.

Another prior construction of multi-groove pulleys has included a one piece pulley formed by numerous press operations by use of various complicated dies. In this construction, the pulley cup is usually first formed with an axially extending flange thereon, which flange is of sufficient length to provide the number of parallel grooves required. This cup is then subjected to numerous press operations using various complicated dies. Such dies frequently have segments which reciprocate perpendicularly to the axially extending flange, which segments, when extended, form a circular ring working against a similar internal ring to form each of the V-grooves. Usually, only a single groove can be formed in one operation, thereby requiring numerous operations to form the total number of grooves required.

The dies necessary for forming this prior construction of multi-groove pulley are very expensive and require constant maintenance resulting in a high cost per piece of the finished product. Further, with such dies, even though very precisely constructed, it is difficult to manufacture pulleys having the required groove width uniformity and the required concentricity. Further, these groove forming metal walls are also usually comparatively soft and frequently rough, causing fast wear of the pulley during use, as well as high belt wear.

It is therefore a general object of the present invention to provide apparatus for forming multi-groove pulleys which overcomes the difficulties of prior constructions.

It is a primary object of the present invention to provide apparatus for forming multi-groove pulleys with which it is possible to form a one-piece multi-groove pulley with extremely close concentricity and uniform groove widths.

It is a further object of the present invention to provide apparatus for forming multi-groove pulleys with which it is possible to form a one-piece multi-groove pulley having grooves that are formed and ironed by rotatable rolls giving smooth and work-hardened groove surfaces.

It is still a further object of the present invention to provide apparatus for forming multi-groove pulleys with which all grooves of the pulley have each of the various operations performed thereon at the same time.

It is another object of the present invention to provide apparatus for forming multi-groove pulleys in which an internal collapsing mandrel supports portions of the undersides of the grooves during roller forming of the grooves, thereby providing uniform, smooth and work-hardened groove surfaces.

It is still another object of the present invention to provide apparatus for forming multi-groove pulleys in which the rolls forming the various grooves float axially in reference to each other and the internal mandrel floats axially as the grooves are being formed, thereby providing exactly located, uniform width, perfectly concentric grooves.

Finally, it is an object of the present invention to provide apparatus for forming multi-groove pulleys which performs all of the above objects in an efficient and economical manner, yet is much less expensive than prior apparatus for forming multi-groove pulleys.

These and other objects are accomplished by the parts, constructions, arrangements, combinations and subcombinations comprising the present invention, the nature of which is set forth in the following general statement, preferred embodiments of which—illustrative of the best mode in which applicants have contemplated applying the principles—are set forth in the following description and illustrated in the accompanying drawings, and which are particularly and distinctly pointed out and set forth in the appended claims forming a part hereof.

In general terms, the improvements in apparatus for forming multi-groove pulleys comprising the present invention may be stated as including in apparatus for roller spinning a series of parallel preferably V-shaped cross-section grooves in one or contiguous flange-walls of a cup-shaped blank, said cup preferably having predetermined uniform axial flange length or lengths; including die apparatus for holding and rotating the cup-shaped blank while the grooves are formed in the flange wall or walls comprised of opposed rotatable headstock and tailstock dies having opposed annular groove forming surfaces, driving means rotating at least one of said dies, said driving means preferably including a spindle on which one of said dies is mounted, the spindle preferably having an opening formed axially therethrough, and means axially moving one of said dies toward and away from the other and exerting axial pressure on the cup while the grooves are formed.

The apparatus also including internal mandrel apparatus for supporting certain portions of the underside of the grooves while the grooves are being formed in the flange wall or walls of the cup comprised of a preferably collapsible mandrel, said mandrel having preferably arcuate working surfaces formed to support the underside of the grooves while the grooves are being formed, said mandrel preferably including a plurality of segments restricted from rotating in reference to the mandrel and movable radially between collapsed and expanded positions the segments having inner portions and outer portions, the mandrel working surfaces being on the outer portions of the segments, preferably arcuate engagement surfaces on the inner portions of the segments, resilient means opposing radial movement of the segments preferably including a garter spring encircling certain portions of the segments, support means selectively engageable with said segment engagement surfaces supporting said segments in expanded position and preventing movement of said segments to collapsed position while the grooves are being formed in the cup, said support means preferably including an axially movable cylindrical member having cam surfaces thereon for engagement with the segment engagement surfaces, means connecting said mandrel to said one die for rotation therewith and for axial movement in reference thereto between a position with the mandrel working surfaces a lesser distance from said one die groove-forming surface to a position with the mandrel working surfaces a greater distance from said one die groove-forming surface, said connecting means preferably including stop means limiting said axial movement of the mandrel working surfaces away from said one die groove-forming surface and resilient means urging said mandrel working surfaces axially away from said one die groove-forming surfaces, and means selectively axially moving said support means between engaged and disengaged position preferably including an axially reciprocal shaft mounted in said spindle axial opening and cylinder means selectively axially reciprocating said shaft in reference to said spindle.

The apparatus further including roll apparatus for forming the grooves in the flange wall or walls of the cup comprised of rotatable roll means operatively mounted on at least one side of the axis of rotation of said dies and mandrel, said roll means having spaced groove-forming surfaces thereon, there being at least one groove-forming surface for each groove formed in the cup, means moving said roll means toward and away from the axis of rotation of said dies and the mandrel, the groove-forming surfaces of said roll means cooperating with the groove-forming surfaces of said dies and the working surfaces of the mandrel when the dies and mandrel are rotated and the roll means moved toward the axis of rotation of said dies and mandrel; said roll means preferably including a roughing roll assembly and a finishing roll assembly mounted at opposite sides of the axis of the dies and mandrel with each of said assemblies including a rotatably mounted roll for each groove to be formed in the pulley cup, said roll means moving means preferably first moving the roughing roll assembly toward and away from the axis of rotation of the dies and mandrel and then the finishing roll assembly, said roll means groove-forming surfaces formed on each of said roughing and finishing rolls, at least certain of the rolls of each of said assemblies movable axially in reference to the other rolls of said each assembly, resilient means urging said axially movable rolls away from said other rolls, and stop means limiting said axial movement of said rolls and causing all of the rolls of each of said assembly to rotate together.

Finally, the apparatus preferably includes a ring apparatus for radially confining the open end of the cup during at least a part of the groove-forming cycle comprised of a ring mounted on one of said dies for rotation therewith and axially movable in relation thereto, said ring preferably having an inner cylindrical axially extending abutment shoulder circumferentially overhanging the annular groove-forming surface on said one die, and means normally urging said ring axially in one direction relative to said one die to a position to be engaged by said roll means and moved thereby axially in the other direction relative to said one die.

Figure 2:
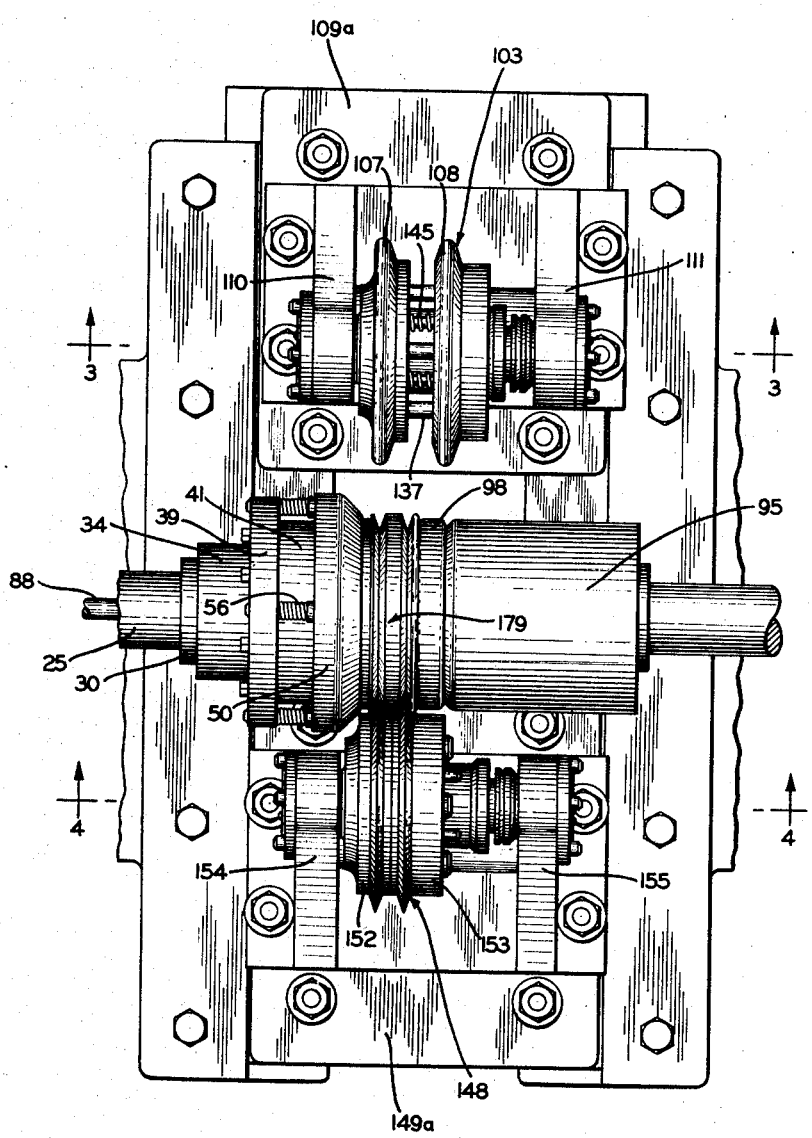
Figure 3:
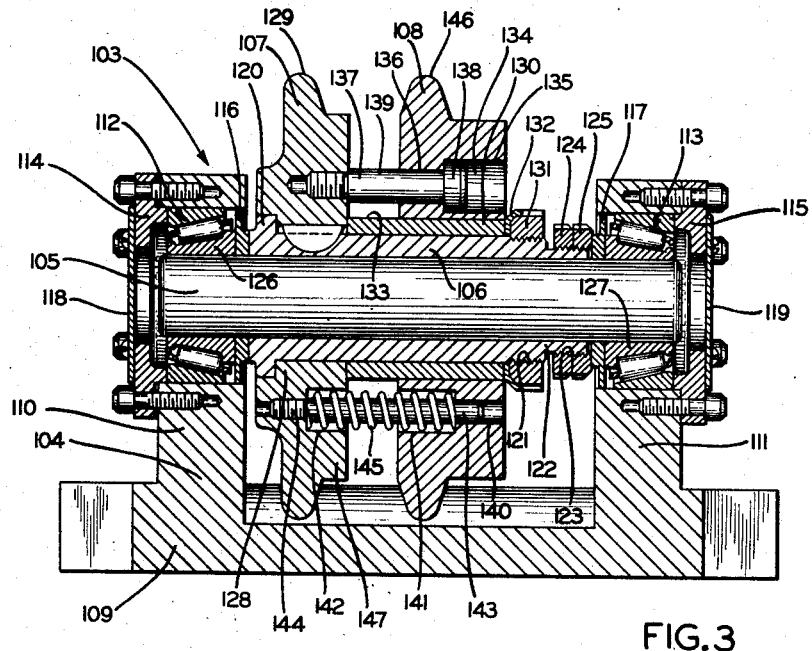
Figure 4:
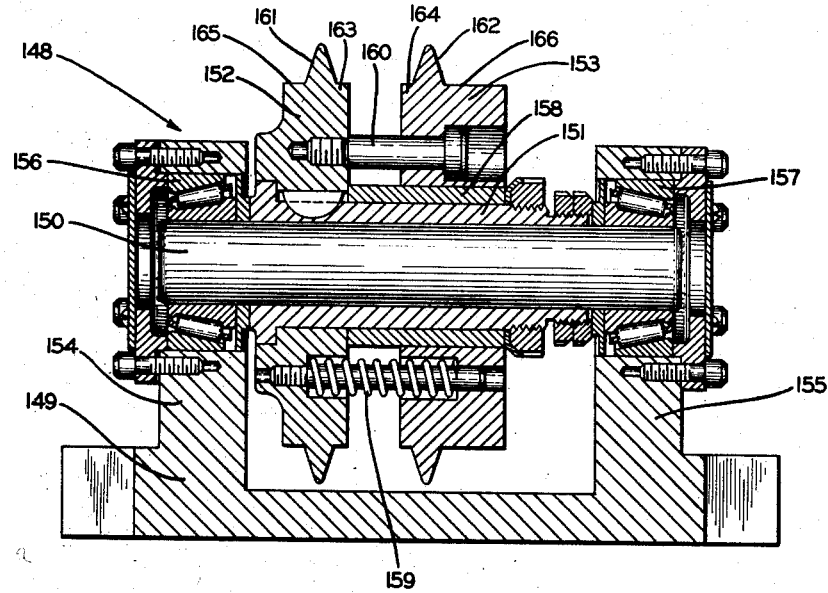
Figures 5, 7:
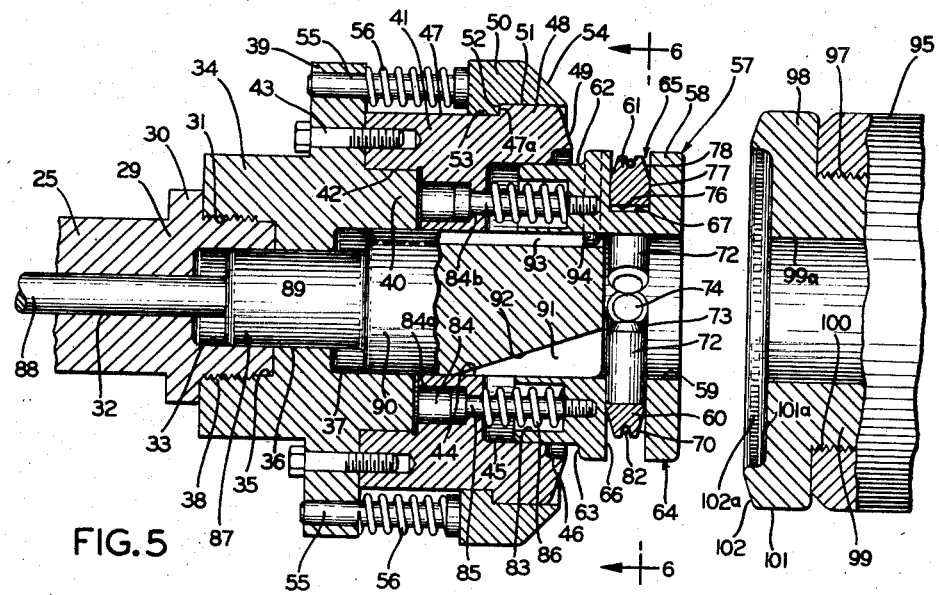
Figure 8:
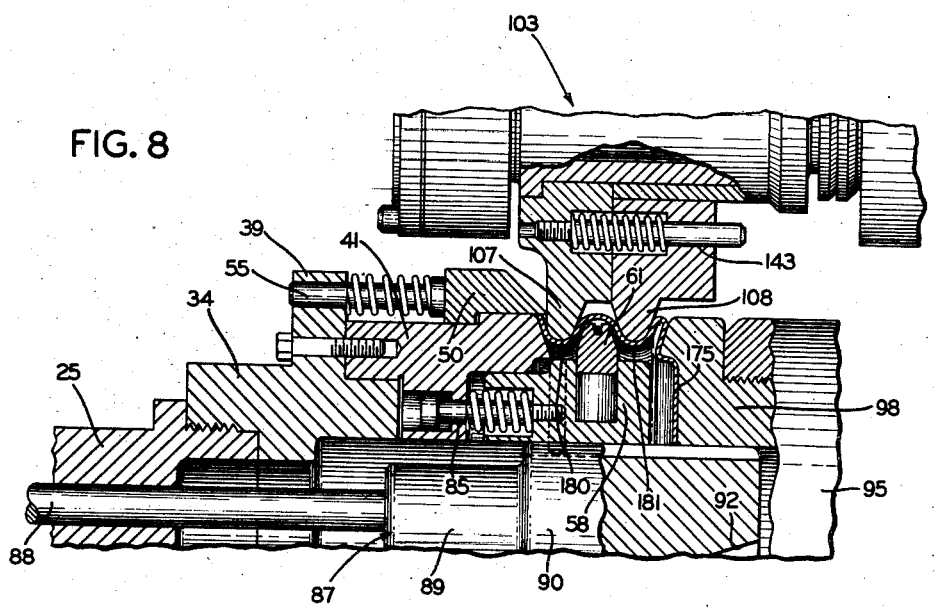
Figure 9:
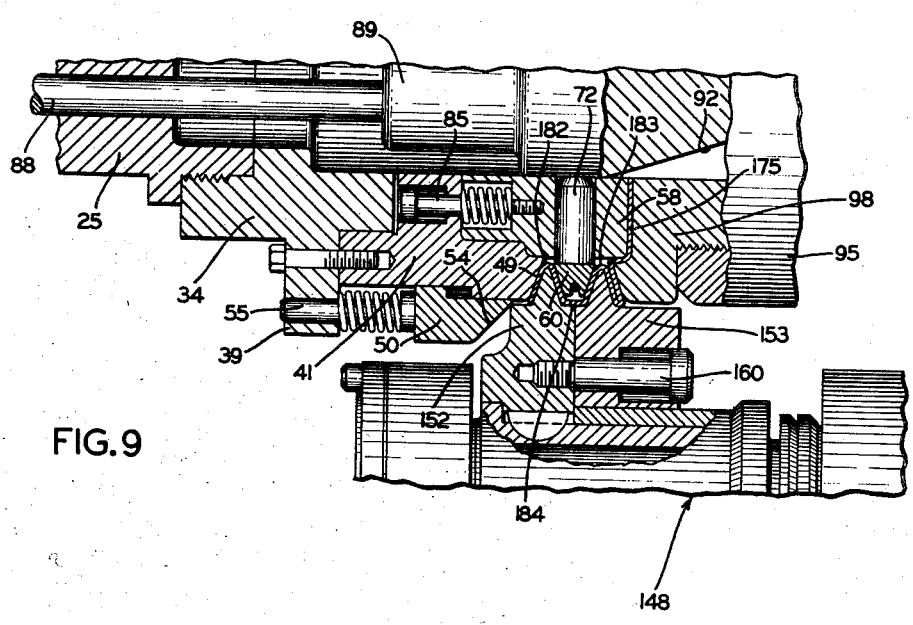
Figure 12:
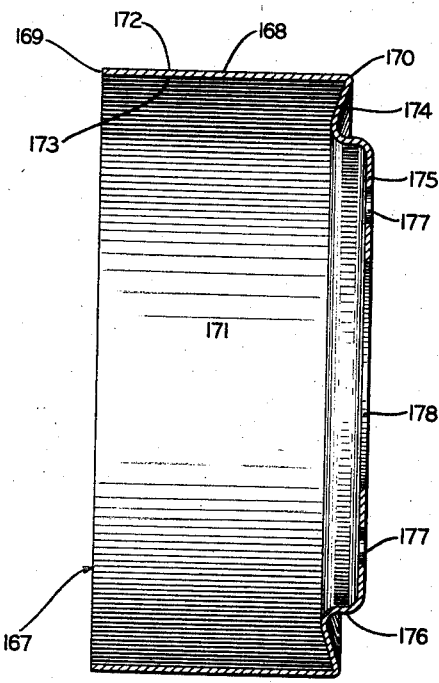
Figure 13:
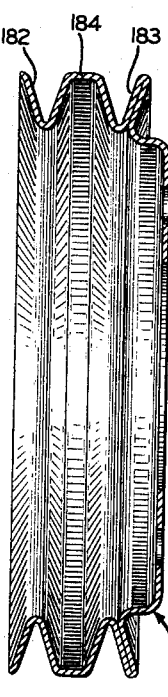
Figure 15:
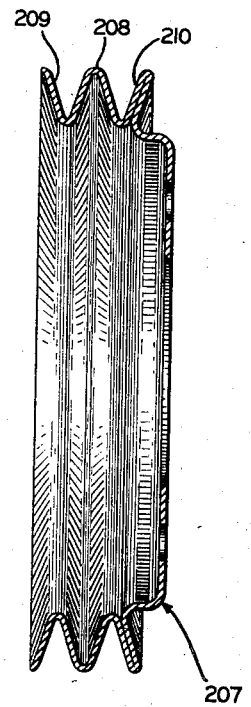
Figure 14:
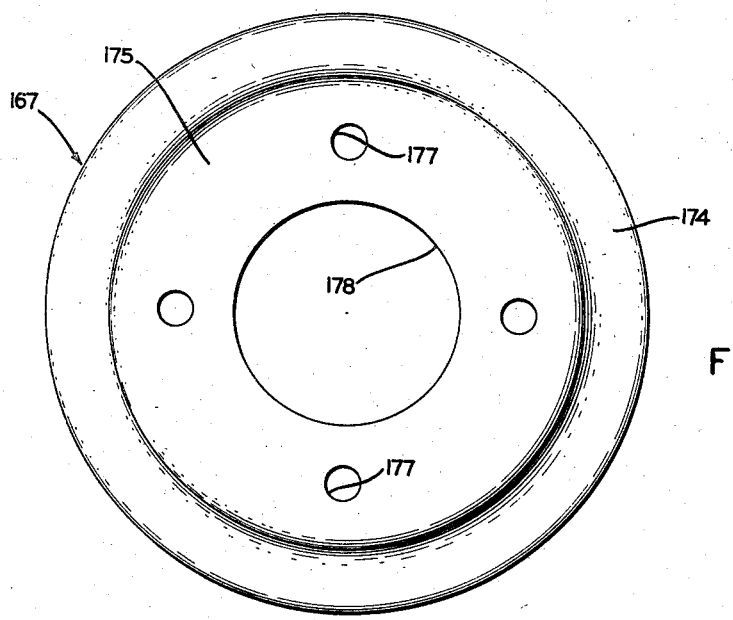

By way of example, embodiments of the improved apparatus for forming multi-groove pulleys of the present invention are illustrated in the accompanying drawings forming a part hereof, wherein like numerals indicate similar parts throughout the several views, and in which:

Fig. 1, a side elevation of a spinning machine incorporating the apparatus illustrating the principles of the present invention;

Fig. 2, an enlarged fragmentary top plan view of the apparatus shown in Fig. 1;

Fig. 3, an enlarged side sectional view, part in elevation, of the roughing roll assembly, looking in the direction of the arrows 3—3 in Fig. 2;

Fig. 4, an enlarged side sectional view, part in elevation, of the finishing roll assembly, looking in the direction of the arrows 4—4 in Fig. 2;

Fig. 5, an enlarged top fragmentary sectional view, part in elevation, of the headstock and tailstock die assemblies, and the mandrel assembly, looking in the direction of the arrows 5—5 in Fig. 1, but with the dies separated;

Fig. 6, a sectional view, part in elevation, of the mandrel assembly, looking in the direction of the arrows 6—6 in Fig. 5;

Fig. 7, a similar view to Fig. 5, but with a blank pulley cup operably positioned between the headstock and tailstock die assemblies, with the mandrel assembly in expanded position, and with the roughing rolls just engaging the blank pulley cup;

Fig. 8, a similar view to Fig. 7, with a portion of the headstock and tailstock die assemblies and the mandrel assembly broken away, and with a fragmentary sectional view of the roughing roll assembly, part in elevation, engaged with and forming the rough grooves in the pulley cup;

Fig. 9, a similar view to Fig. 8, but with a fragmentary sectional view, part in elevation, of the finishing roll assembly engaged with and forming the finish grooves in the pulley cup;

Fig 10, a fragmentary sectional view, part in elevation, illustrating a second embodiment of the mandrel assembly;

Fig. 11, a sectional view, part in elevation, looking in the direction of the arrows 11—11 in Fig. 10;

Fig. 12, a vertical axial sectional view of a pulley cup blank;

Fig. 13, a similar view to Fig. 12 with the finished grooves formed in the pulley cup;

Fig. 14, an end elevation looking in the open end of the pulley shown in Fig. 13;

Fig. 15, a vertical axial sectional view, similar to Fig. 13, but with a lesser distance between the finished grooves, as formed by use of the second embodiment of the mandrel assembly.

The spinning machine, generally indicated at 20, shown in Fig. 1, may be of any standard and usual type such as illustrated, described or referred to in the Nelson Patent No. 1,680,061, the Harrison Patents Nos. 1,828,464 and 2,062,415 and the Wickwire et al. Patent No. 2,685,856. It should be understood that the spinning machine is not claimed as a part of the present invention other than the parts thereof in combination with the apparatus for forming multi-groove pulleys illustrated and described herein.

The spinning machine 20 is preferably powered by an electric motor 21, which motor, for the purposes of the present invention, preferably has mounted thereon and drives a combination brake and clutch 22. Brake and clutch 22 is provided with a pulley 23, which pulley is operatively connected to a pulley 24 mounted on and driving the headstock spindle 25 by means of a preferably flat belt 26. Headstock spindle 25 is journalled in machine 20 for rotation in reference thereto, but preferably fixed axially in reference thereto.

Tailstock spindle 27 is also mounted journalled in machine 20 in axial alignment with headstock spindle 25, as shown. The portion of machine 20 in which spindle 27 is journalled is movable axially of spindle 27 and is preferably provided with power means for axially moving this mounting portion of machine 20 and the tailstock spindle 27. Thus, tailstock 27 is rotatable in reference to machine 20 and is movable axially in reference to headstock spindle 25.

Either or both of the spindles 25 and 27 may be mounted and constructed so that they may be driven by a drive means such as the electric motor 21, and either or both may be mounted and constructed to be moved axially of the machine 20, without affecting the principles of the present invention. It is preferred, however, that only the headstock spindle 25 be driven and that it is not axially movable in reference to the machine 20, while the tailstock spindle 20 is mounted movable axially of machine 20 but is driven only by its connection with the apparatus to be hereinafter described.

The machine 20 is also provided with a means for moving the spinning roll means, to be hereinafter described, toward and away from the axis of the headstock and tailstock spindles 25 and 27. Such apparatus, generally indicated at 28, is preferably geared and otherwise connected in timed relation with the drive motor 21 so that apparatus 28 will move the spinning roll means to and from the axis of spindles 25 and 27 in a predetermined cycle.

The tool mounting end 29 of headstock spindle 25 is provided with a radially outwardly extending flange 30 spaced from the end thereof, as shown in Fig. 5, with the portion of spindle 25 extending from flange 30 to the end thereof having threads 31 formed thereon. A preferably cylindrical opening 32 is formed centrally through headstock spindle 25 and lengthwise thereof. Opening 32 is preferably formed of a uniform diameter throughout the length thereof to a point spaced from the end of spindle 25 at the tool mounting end 29, and at this point, is formed into a larger diameter portion 33 to the end of spindle 25.

Headstock adapter 34 is provided with a centrally located axially extending bore formed therethrough consisting of a spindle connecting portion 35 of a diameter slightly greater than the outside diameter of spindle 25, a smaller diameter support means pilot portion 36, and a larger diameter support means pilot portion 37. Portion 35 is provided with threads 38 so that that the adapter 34 may be threably received on the tool mounting end 29 of the headstock spindle 25, as shown, until adapter 34 abuts the flange 30 on spindle 25. The opening 32 with the larger diameter portion 33 formed in spindle 25, and the smaller diameter support means pilot portion 36 and larger diameter support means pilot portion 37 formed in adapter 34, are for a purpose to be hereinafter described.

Adapter 34 is provided with a radially outwardly extending flange 39 on the outer circumference thereof, which flange is preferably spaced from the spindle mounting end of adapter 34, as shown. Adapter 34 is thereafter formed into a preferably cylindrical headstock pilot portion 40.

Headstock die 41 is preferably generally cylindrical in configuration and is received over the headstock pilot portion 40 of adapter 34, with pilot portion 40 being received in a centrally located bore 42 formed centrally and axially in headstock die 41. Die 41 abuts the flange 39 on adapter 34 and is fixedly retained over pilot portion 40 and abutting flange 39 by preferably bolts 43, which bolts are received through flange 39 by adapter 34 and are threably received in headstock die 41, as shown.

Headstock die 41 is formed with a mandrel support means pilot portion 44, consisting of a bore formed centrally and axially therein communicating with bore 42 and extending a distance from bore 42. Bore 44 is of a smaller diameter than bore 42, and die 41 is thereafter formed into a mandrel pilot bore 45 of a larger diameter than bore 44. Bore 45 terminates in an annular shoulder portion 46 which terminates at the inner end of die 41, or the end thereof away from adapter 34.

The outer diameter of headstock die 41 is preferably an amount smaller than the outer diameter of flange 39 of adapter 34 and is of this diameter from flange 39 to within a distance of the inner end of die 41 forming an axially extending surface 47. Die 41 is then formed with a shoulder portion 47a, which extends radially outwardly of die 41 to an outer increased diameter portion 48. Die 41 is of this increased diameter from shoulder 47a to its inner end where it is formed into a downwardly angled annular groove-forming surface 49, which surface 49 terminates inwardly at the annular shoulder portion 46.

The annular ring 50 is mounted surrounding the headstock die 41 and overhanging the annular groove-forming surface 49 formed on die 41. Ring 50 is provided on its inner circumference with an axially extending surface 51, which surface telescopes over and surrounds the outer increased diameter portion 48 on die 41.

Surface 51 terminates axially outwardly from the groove-forming surface 49 on die 41, in a radially inwardly extending shoulder 52, which shoulder normally abuts the shoulder 47a formed on die 41. Ring 50 is thereafter provided with an axially extending inner surface 53 which abuts the smaller outer diameter surface 47 of die 41.

Ring 50 is further provided with an angled roll engaging surface 54, which surface commences at the inner or overhanging end of surface 51 and angles outwardly towards the flange 39 on adapter 34 terminating at the outer circumference of ring 50 at a diameter slightly larger than the outer diameter of flange 39. The outer end of ring 50 or the end nearest the flange 39 on adapter 34 is engaged by a series of circumferentially spaced pins 55, which pins extend from ring 50 axially outwardly and are slidably received through flange 39 of adapter 34.

Helical springs 56 are received around each of the pins 55 between the ring 50 and the flange 39, with said springs thereby normally urging ring 50 axially inwardly so that the shoulder 52 of ring 50 normally abuts the shoulder 47a of die 41. Since pins 55 are received in slidable relation through flange 39, a pressure applied to the angled surface 54 of ring 50 will cause the springs 56 to compress, permitting the ring 50 to move axially outwardly, that is, tending to move it towards flange 39, while the pins 55 will slide through the flange 39.

The mandrel assembly generally indicated at 57 and best seen in Figs. 5 and 6, includes a support member 58 having an axially extending preferably cylindrical bore 59 formed throughout the length of member 58. Mandrel 57 is also provided with a set of circumferentially spaced groove-supporting segments 60 and a set of circumferentially spaced groove-supporting segments 61.

Bore 59 in support member 58 is of the same diameter as the bore 44 in die 41 and pilot portion 37 in adapter 34. Member 58 is formed on its outer circumference with a pilot portion surface 62, which surface extends from the outer end, or the end towards the headstock spindle 25, inwardly to within a distance of the inner end of member 58. At this point, member 58 is formed with a radially extending shoulder 63, which shoulder extends from surface portion 62 radially outwardly to an increased diameter portion surface 64.

Portion 62 is of a diameter slightly smaller than the diameter of the bore 45 in die 41, and this portion 62 is telescopically received in bore 45 of die 41, as shown in Fig. 5. Also, portion 64 is of a diameter slightly smaller than the shoulder portion 46 of die 41, so that the portion 64 of support member 58 may be telescopically received partially in shoulder portion 46 of die 41.

Portion 64 of member 58 is formed with an annular recess 65 therein, completely around the circumference thereof, spaced from the inner end of member 58. Recess 65 is preferably formed with radially extending side surfaces 66 and an axially extending annular bottom surface 67.

Segments 60 are formed with outer arcuate surfaces 68, inner arcuate surfaces 69, angled side working surfaces 70 and angled end surfaces 71. Surfaces 69 are of a width greater than surfaces 68 so that the angled sides 70 taper inwardly toward each other from surfaces 69 to surfaces 68, as shown in Fig. 5. Also, the lengths of surfaces 69 are greater than the lengths of surfaces 68 so that the end surfaces 71 taper inwardly toward each other, as shown in Fig. 6.

The inner surfaces 69 of segments 60 are provided with preferably circular pilot members 72 fixedly mounted centrally of surfaces 69 and extending radially inwardly to within a distance of the center axis of support member 58 when segments 60 are positioned in spaced relationship to each other in recess 65, as shown in Fig. 5. These pilot members 72 are received through circumferentially spaced preferably circular openings 73 formed radially between the bottom surface 67 of recess 65 and the bore 59 of member 58. The inner ends of pilot members 72 are tapered inwardly so that the innermost ends of member 72 are of a smaller diameter than the major portion of the length of member 72, as shown, thereby forming the annular tapered cam surfaces 73 and the circular cam surfaces 74 for a purpose to be hereinafter described.

Segments 61 are formed with outer arcuate surfaces 75, inner arcuate surfaces 76, side radially extending surfaces 77, side inwardly angled working surfaces 78 and angled end surfaces 79. The width of inner surfaces 76 is greater than the width of outer surfaces 75, with the side 77 extending radially outwardly from surfaces 76 to a point spaced from the outer surfaces 75, and the angled working surfaces 78 extending from this point to surfaces 75.

Also, the lengths of surfaces 76 are smaller than the lengths of surfaces 75, with the angled end surfaces 79 extending between these inner and outer surfaces. Segments 61 are also received in the recess 65 with the side radially extending surfaces of segments 61 abutting the radially extending side surfaces 66 of recess 65 and in slidable relationship thereto.

Thus, in side view, as shown in Fig. 6, the segments 61 taper inwardly and the segments 60 taper outwardly from their outer surfaces to their inner surfaces. Further, both sets of segments 60 and 61 in end view, as shown in Fig. 5, taper inwardly from their inner surfaces to their outer surfaces.

Both the outer surfaces 68 of segments 60 and the outer surfaces 75 of segments 61 are formed with circumferentially extending circumferentially aligned spring receiving recesses 80 and 81 respectively, for reception of the helical garter spring 82. When the spindle 25 is at rest, that is, not rotating, thereby placing the mandrel 57 at rest, the segments 60 and 61 are in the position shown in Figs. 5 and 6.

Further the pilot members 72 are at their innermost radial position so that the angled cam surfaces 73 are in abutting relation, thereby placing the segments 60 at their innermost radial position supported on members 72. Also, the segments 61 are at their innermost radial position retained there by the garter spring 82 received in the recesses 81 therein, so that the angled end surfaces 79 of segments 61 are abutting and rest on the angled end surfaces 71 of segments 60, as shown.

When spindle 25 rotates, thereby rotating mandrel 57, either centrifugal force or other means to be hereinafter described, forces the segments 60 and 61 to slide in the recess 65 to their outermost radial positions, as shown in dotted lines in Fig. 6 and in cross-section in Fig. 7. In this position, the end surfaces 71 and 79 of segments 60 and 61 respectively, are still in abutting relation, but in a position in reference to each other so that the outer surfaces 68 and 75 of segments 60 and 61 respectively, and angled working surfaces 70 and 78 of segments 60 and 61 respectively, are in circumferential alignment.

Thus, when the segments 60 and 61 are in expanded position, they form a continuous circumferentially extending axial surface and continuous circumferentially extending working surfaces, for a purpose to be hereinafter described. Also, when segments 60 and 61 are in this extended or expanded position, the garter spring 82 is not only received and retained in the recesses 81 of segments 61, but is also received in the recesses 80 of segments 60.

The outer end of member 58, or the end thereof nearest the die 41, is formed with radially spaced axially extending spring-receiving holes 83 spaced outwardly from the inner bore 59 and inwardly from the outer surfaces 62 and 64. Further, die 41 is formed with radially spaced axially extending bolt-receiving holes 84 spaced outwardly from inner bore 44 and inwardly from inner bore 42.

Holes 84 are of a uniform diameter from the outer end of die 41, or the end nearest the adapter 34, to within a distance of the inner end of die 41, or the end thereof towards the mandrel 57 forming large diameter hole portions 84a. These holes are then formed of a smaller diameter to the inner end of die 41 forming small diameter hole portions 84b.

Bolts 85, having heads of a slightly smaller diameter than the larger diameter hole portions 84a, and shanks of slightly larger diameter than the smaller diameter hole portions 84b, are received in hole 84 and extend axially through the spring-retaining holes 83 in the mandrel 57, thereafter being threadably received in the support member 58. Helical springs 86 are positioned surrounding bolts 85 between the die 41 and the support member 58 of mandrel 57, with the ends of these springs being received in the spring-retaining holes 83 in member 58.

Thus, when the mandrel 57 is assembled in operable position, with the pilot portion surface 62 of member 58 telescoped within the larger diameter bore 45 of die 41, the springs 86 normally urge the mandrel 57 in a direction away from adapter 34, so that the shoulder 63 on member 58 is axially spaced from the shoulder portion 46 on die 41, and so that the heads of the bolts 85 are at their farthest axial position away from the adapter 34, in the larger diameter hole portions 84a.

If pressure is applied tending to move the mandrel 57 axially in the direction towards adapter 34, further telescoping the member 58 within the die 41, the springs 86 will compress and the heads of the bolts 85 will move along the length of the larger diameter hole portion 84a, until the shoulder portion 63 of member 58 abuts the shoulder portion 46 of the die 41, thereby preventing any further axial movement between the die 41 and the mandrel 57 in the direction towards the adapter 34. Although bolts 85 are slidable within the holes 84 in die 41, they may not move radially in relation to die 41, so that when die 41 is caused to rotate, this will also cause mandrel 57 to rotate.

Thus, there is provided means permitting axial movement between mandrel 57 and die 41, means urging mandrel 57 to move axially in relation to die 41 thereby causing the working surfaces 70 and 78 of the segments 60 and 61 to move axially away from the groove-forming surface 49 on die 41, and means limiting this axial movement between die 41 and mandrel 57.

The mandrel segment support assembly, generally indicated at 87, preferably includes an actuating shaft 88, a small diameter portion 89 and a large diameter portion 90. Shaft 88 is received in opening 32 of spindle 25 and is axially slidable in relation to spindle 25 and rotatable therewith.

Smaller diameter portion 89 is generally cylindrical in configuration having an outer diameter slightly smaller than the diameter of portion 33 in the tool mounting end 29 of spindle 25 and pilot portion 36 in adapter 34. Portion 89 is fixedly secured to shaft 88 and is received in portion 33 of spindle 25 and portion 36 of adapter 34 in slidable relation thereto.

Large diameter portion 90 is also generally cylindrical in configuration having an outside diameter slightly smaller than the pilot portion 37 of adapter 34, bore 44 in die 41 and bore 59 in member 58 of mandrel 57. Portion 90 is fixedly secured to portion 89, being telescopically received in pilot portion 37 of adapter 34, bore 44 of die 41 and bore 59 of mandrel 57, and is slidable in relation thereto.

Portion 90 is provided with circumferentially spaced radially extending inwardly tapered slots 91, with each of said slots being in axial alignment with one of the pilot members 72 of mandrel 57. Slots 91 begin at a point spaced from the outer or end of portion 90 in the direction towards the spindle 25, and taper towards the center axis of portion 90 to the inner end of portion 90, or the end thereof in the direction away from spindle 25, thereby forming tapered cam surfaces 92.

Cam surfaces 92 begin at the outermost diameter of portion 90 and terminate at a diameter slightly larger than the diameter at which the inner ends of the pilot member 72 of mandrel 57 describe when these pilot members are at their innermost radial position. In other words, tapered cam surfaces 92 preferably terminate at a point in axial alignment with the annular tapered cam surfaces 73 of pilot members 72, as shown.

The outer diameter surface of portion 90, from tapered cam surfaces 92 to the outer end of portion 90 or the end thereof in the direction of spindle 25, also serves as a cam surface during the operation of the support assembly 87, as will be hereinafter described.

An axially extending aligning slot 93 extending the length of portion 90 is also provided in the outer surface thereof, which slot is engaged by the inner end of the radially extending aligning pin 94. Pin 94 is fixedly secured in member 58 of mandrel 57 and projects radially into slot 93, so that portion 90 may move axially but may not rotate in reference to member 58, thereby always retaining the tapered slots 91 axially aligned with pilot members 72.

Preferably power actuated means is provided so that the shaft 88 may be selectively moved axially in either direction in reference to spindle 25. As shown in Fig. 5, when the segments 60 and 61 of the mandrel 57 are in collapsed or their innermost radial position, the support assembly 87 is in a position with the smaller diameter portion 89 telescoped within the larger diameter portion 33 of spindle 25, and with the innermost end of portion 90 spaced axially from the pilot members 72 of mandrel 57.

When it is desired to expand segments 60 and 61 of mandrel 57 or place them in the position shown in dotted lines in Fig. 6, the shaft 88 may be moved axially in the direction toward the mandrel 57, thereby moving the portions 89 and 90 axially, causing the tapered cam surfaces 92 of portion 90 to engage the tapered cam surfaces 73 on pilot members 72 of mandrel 57. Cam surfaces 92 of portion 90 will move axially along cam surfaces 73 of pilot members 72, causing pilot members 72 to move radially outwardly, forcing the segments 60 radially outwardly, which in turn force the segments 61 radially outwardly until the circular cam surfaces 74 ultimately are engaged with the outer diameter surface of portion 90.

The radially outward movement of segments 60 and 61 is opposed by the garter spring 82. When the spindle 25 is rotated thereby rotating adapter 34, die 41 and mandrel 57, if spring 82 is of sufficient strength to resist the centrifugal force of the segments 60 and 61, these segments will remain in their collapsed or innermost radial position until the mandrel segment support assembly 87 is moved axially causing the segments 60 and 61 to move radially outwardly into expanded position, as described above. In this case, even though mandrel 57 is rotating, the segments 60 and 61 will remain in collapsed position until they are forced into expanded position by the portion 90.

If, however, when the mandrel 57 is rotated, the spring 82 is not sufficient to resist the centrifugal force of segments 60 and 61, these segments will move radially outwardly into expanded position without any engagement by the portion 90 of assembly 87. In this event, the portion 90 of assembly 87 may be moved to force the segments 60 and 61 out before mandrel 57 is rotated, or after rotation of mandrel 57 may thereafter be moved axially so that the circular cam surfaces 74 of pilot members 72 are overlying the outer diameter surface of portion 90.

Portion 90 will thereby limit any radially inward movement of the pilot members 72 and retain the segments 60 and 61 in expanded position. In any case, however, when the assembly 87 is moved axially to the position shown in Fig. 5, and the rotation of the mandrel 57 is stopped, the garter spring 82 will always cause the segments 60 and 61 to return to their collapsed or innermost radial position, as shown in Figs. 5 and 6.

Thus, there is provided means for supporting and retaining the segments 60 and 61 in their expanded or outermost radial position, means for urging the segments 60 and 61 to collapsed or their innermost radial position when not so supported, and means for moving the segments 60 and 61 from collapsed to expanded position even when the garter spring 82 is sufficient to resist the centrifugal force of the segments 60 and 61 when the segments 60 and 61 are rotating.

Tailstock spindle 27, as shown in Fig. 1, is preferably provided with an adapter 95 threadably received and secured thereon against a flange 96, similar to adapter 34 and spindle 25. Adapter 95 is provided with an axially extending centrally located bore provided with the threads 97, as shown, for instance, in Fig. 5. Tailstock die 98 is provided with a smaller diameter portion 99 having the threads 100 formed on the outer diameter thereof. Die 98 is threadably received in the adapter 95 with the threads 100 of die 98 engaged with the threads 97 of adapter 95.

Die 98 is further provided with a larger diameter portion 101 which terminates in an inwardly tapered annular groove-forming surface 102. Surface 102 terminates radially inwardly in a shoulder portion 101a forming a larger diameter bore 102a extending from the inner end of die 98, or the end thereof in the direction of the mandrel 57, a distance outwardly axially of and centrally within die 98.

Smaller diameter bore 99a is formed axially of and centrally within die 98 and extends from bore 102a outwardly, or in a direction away from mandrel 57, with bore 99a being of at least as great and preferably a diameter equal to the diameter of bore 59 in mandrel 57. Bore 102a is of a diameter slightly larger than the increased diameter portion 64 of mandrel 57.

Thus, since tailstock spindle 27 is movable axially of the headstock spindle 25 as before described, when spindle 27 is moved axially towards spindle 25, the groove-forming surface 102 of tailstock die 98 will be moved axially toward the groove-forming surface 49 on headstock die 41. Further, if die 98 is moved a sufficient distance, the increased diameter portion 64 of mandrel 57 may be received in bore 102a of tailstock die 98 and abutting shoulder 101a.

Annular groove-forming surfaces 49 and 102 on dies 41 and 98 respectively, may or may not be in axial alignment depending on the particular type of multi-groove pulley to be formed with the apparatus of the present invention. For the purposes of the present embodiment of the invention herein illustrated and described, however, to form the multi-groove pulley which will be hereinafter described, these groove-forming surfaces must be and are shown in axial alignment.

In other words, if the several grooves to be formed are the same radial distance from the center axis of the pulley, then the groove-forming surfaces of the dies would be in axial alignment. If, however, the several grooves to be formed are at different radial distances from the center axis of the pulley, these groove-forming surfaces on the dies may or may not be in axial alignment, depending on the particular configuration of pulley to be formed.

The roughing roll assembly, generally indicated at 103, preferably includes a roll holder 104, a spindle 105 and a mounting shaft 106. For the purposes of the present embodiment of the present invention shown and described herein, the roughing roll assembly 103 also preferably includes an axially stationary roll 107 and an axially movable roll 108.

The roll holder 104 preferably includes a horizontal base portion 109 and laterally spaced vertically extending upright members 110 and 111. The spindle 105 is preferably journalled in members 110 and 111, extending horizontally therebetween by means of suitable bearings such as the roller bearings 112 and 113, which are received in the upright members 110 and 111 respectively, as shown in Fig. 3.

Bearings 112 and 113 are retained in place in the upright members 110 and 111 by suitable retaining means such as the retaining rings 114 and 115 preferably bolted to the outer sides of the upright members 110 and 111 respectively, and the retaining rings 116 and 117 received at the inner sides of the upright members 110 and 111 respectively. Retaining rings 114 and 115 are also provided with cover plates 118 and 119 respectively, as shown.

Mounting shaft 106 is mounted telescoped over spindle 105 and is provided with a vertically extending flange 120 spaced from the end thereof towards the upright member 110, and a threaded portion 121 spaced from the end thereof nearest the upright member 111. Shaft 106 is further provided with a decreased diameter portion 122 adjacent the threaded portion 121 in the direction towards the upright member 111, with decreased diameter portion 122 being provided with the threads 123 formed thereon and extending to the end of shaft 106 nearest the upright member 111.

Shaft 106 is axially retained abutting the retaining ring 116 received in the upright member 110, by means of nuts 124 and 125, which nuts are received on the decreased diameter portion 122 engaged with the threads 123. Nut 125 is positioned abutting the retaining ring 117 received in the upright member 111, and thereby forces the shaft 106 in its position abutting the retaining ring 116 positioned in the upright member 110. Nut 124 serves as a lock nut to retain nut 125 in position.

Spindle 105 is preferably received in the inner race 126 of bearing 112 and the inner race 127 of bearing 113, by means of a press fit, and thereby is freely rotatable with bearing races 126 and 127 in reference to the roll holder 104. Also, the retaining rings 116 and 117 are preferably provided with clearance in reference to the upright members 110 and 111 of the roll holder 104, and these rings tightly abut the inner races 126 and 127 of the bearings 112 and 113. Thus, with the nuts 124 and 125 abutting the retaining ring 117 and forcing the shaft 106 axially so that it abuts the retaining ring 116, rotation of the shaft 106 rotates the retaining rings 116 and 117, the inner races 126 and 127 of the bearings 112 and 113 and the spindle 105.

Roll 107 is positioned preferably keyed to and surrounding the shaft 106 at a point spaced from the end of the shaft nearest the upright member 110, and is provided with a recessed shoulder portion 128 which is engaged over the flange 120 on shaft 106. Roll 107 is further provided at its outer circumference with a preferably arcuate cross-section annular groove-forming surface 129.

The hollow cylindrical sleeve bearing 130 is also received telescoped over the shaft 106 abutting the side of the roll 107 and extending to within a distance of the threaded portion 121 of shaft 106. Nut 131, threadably received on the threaded portion 121, and spacer washer 132, retain the sleeve bearing 130 abutting the roll 107, as shown.

Since nut 131 and spacer washer 132 retain the sleeve bearing 130 abutting the roll 107, and the sleeve bearing 130 thereby retains the roll 107 against the flange 120 of the shaft 106, roll 107 is stationary axially of shaft 106, spindle 105 and roll holder 104. Further, since roll 107 is keyed to shaft 106 and shaft 106 is rotatable with the spindle 105, rotation of roll 107 rotates shaft 106 and spindle 105.

Roll 108 is mounted surrounding the sleeve bearing 130 and is axially slidable over the outer circumferential surface 133 of bearing 130. Thus, roll 108 is slidable axially in reference to roll 107, shaft 106, spindle 105 and roll holder 104.

Roll 108 is provided with radially spaced axially extending stop pin holes 134, which holes are preferably comprised of large diameter portions 135 and small diameter portions 136. Portions 135 extend from the side of roll 108 furthermost from roll 107 partially through roll 108, and the small diameter portions 136 extend from portion 135 the remaining distance to the side of roll 108 nearest the roll 107.

Cap screws 137, having the head portions 138 and the shank portions 139, are received through the holes 134, with the head portions 138 slidable in the large diameter portions 135 and the shank portions 139 slidable in the small diameter portions 136. Further the shank portions 136 extend between the rolls 107 and 108 and are threadably engaged in the roll 107.

Roll 108 is further provided with radially spaced axially extending spring pin holes 140 extending from the side of roll 108 furthermost from roll 107 a distance inwardly, and the spring holes 141 extending from the end of holes 140 to the side of roll 108 nearest the roll 107. Roll 107 is also provided with a series of radially spaced axially extending spring holes 142, which holes are axially aligned with the spring holes 141 in roll 108 and of equal diameter thereto.

The spring pins 143 are received slidable in the spring pin holes 140 of roll 108 and extending through the spring holes 141 of roll 108 and 142 of roll 107, with the ends of these pins being threadably engaged in the roll 107 as at 144. Helical springs 145 are mounted surrounding the spring pins 143, received in the spring holes 141 of roll 108 and the spring holes 142 of roll 107, and bearing against the rolls 107 and 108 urging the roll 108 axially away from the roll 107.

Thus, roll 108 is normally urged axially away from roll 107 by the springs 145, with such axial movement being permitted by the spring pins 143 sliding in the spring pin holes 140 in roll 108, and the shank portions 139 of the cap screws 137 sliding in hole portions 136 in roll 108. Such axial movement is limited, however, by the head portions 138 of the cap screws 137 engaging the roll 108 at the inner end of the hole portions 134.

Roll 108 is further provided on the outer circumference thereof with preferably arcuate cross-section annular groove-forming surfaces 146. Due to the before described construction, if pressure is applied to the groove-forming surface 146 of roll 108 tending to move the roll 108 axially towards roll 107, such axial movement compresses the springs 145 and is permitted by the spring pins 143 sliding in the spring pin holes 140, and further by the cap screws 137 sliding in the cap screw holes 134. Such axial movement of roll 108 towards roll 107 is only limited by roll 108 abutting roll 107, but it is preferable that roll 107 be provided with the shoulder portion 147 so that the groove-forming surfaces 129 on roll 107 are always in spaced relationship with the groove-forming surfaces 146 on roll 108.

Thus, there is provided roll means in the embodiment shown including two rotatable rolls, one of which is fixed axially and one of which is movable axially, with the movable roll being normally urged axially away from the axially stationary roll by resilient means, and with such axial movement of the movable roll being limited by stop pin means. Further, the stop pin means provides a connection between the two rolls causing them to rotate together.

The finishing roll assembly, generally indicated at 148, is similar to the roughing roll assembly 103 and includes similar roll holder 149, spindle 150, mounting shaft 151, axially stationary roll 152 and axially movable roll 153. As in the roughing roll assembly, the roll holder 149 is provided with upright members 154 and 155 in which the spindle 150 is journalled by means of the bearings 156 and 157. Also, as in the roughing roll assembly, the axially movable roll 153 is mounted surrounding and slidable on the sleeve bearing 158.

Further, as in the roughing roll assembly, the axially movable roll 153 is urged axially away from the stationary roll 152 by springs 159, and this axial movement is limited by stop pin cap screws 160. Thus, in the finishing roll assembly 148, as in the roughing roll assembly, the axially stationary roll 152 is rotatable with the shaft 151 and spindle 150, while the stop pin screws 160 cause the axially movable roll 153 to move with the stationary roll 152.

Both of the finishing rolls 152 and 153 are provided with annular groove-forming surfaces 161 and 162. In the case of the finishing rolls, however, the groove-forming surfaces 161 and 162 are preferably generally wedge shaped or triangular in cross-section conforming to the cross-section configuration of the particular grooves that are to be formed in the finished pulley. In any event, the axial widths of the groove-forming surfaces 161 and 162 on the finishing rolls 152 and 153 will usually be less than the axial widths of the roughing rolls 107 and 108 in the roughing roll assembly 103.

The finishing rolls 152 and 153 are further preferably each provided with shoulder portions 163 and 164 respectively, with these shoulder portions formed on the neighboring sides of the rolls 161 and 162, so that when the roll 153 is axially abutting the roll 152, the shoulders 164 and 163 are adjacent each other and the groove-forming surfaces 162 and 161 are axially spaced from each other. Further, it is preferable that the finishing rolls 152 and 153 are also each provided with annular shoulder portions 165 and 166 respectively at the sides thereof opposite from the shoulder portions 163 and 164, that is, the sides of the rolls 161 and 162 towards the upright members 154 and 155 of the roll holder 149.

The roll holders 109 and 149 of the roughing roll assembly 103 and the finishing roll assembly 148 are preferably each mounted on slides 109a and 149a respectively, as shown in Fig. 2. These slides are preferably positioned at horizontally opposite sides of the headstock die 41 and the tailstock die 98 with slides 109a and 149a selectively slidable toward and away from the headstock and tailstock dies by the moving means 28, hereinbefore described and generally shown in Fig. 1.

The axis of the spindles 105 and 150, and therefore the roughing rolls 107 and 108 and finishing rolls 152 and 153, are preferably parallel to the axis of the headstock die 41 and the tailstock die 98. Thus, the annular groove-forming surfaces 129 and 146 of the roughing rolls 107 and 108, and the annular groove-forming surfaces 161 and 162 of the finishing rolls 152 and 153, are movable toward and away from the annular working surfaces 49 and 102 on the headstock die 41 and the tailstock die 98.

As shown in Fig. 12, a pulley cup, generally indicated at 167, in which the spaced parallel grooves are to be formed with the apparatus of the present invention, is preferably formed by one or more usual stamping press operations to provide the cup with an annular axially extending flange 168 having an open end 169 and a closed end 170. Pulley cup 167 is also provided with the closed end 170 integrally connected with a generally radially extending flange portion 171.

Axial flange 168 is also provided with an outer annular surface 172 and an inner annular surface 173 and is preferably trimmed to a predetermined uniform length, as shown. Pulley cups 167 are preferably formed from 14 ga. to 18 ga. hot rolled steel, but this is dependent on the construction of finished pulley desired.

The radial flange portion 171 of the blank pulley cup 167 shown in Fig. 12, is preferably formed with an angled outer double flange groove portion 174, and a radially extending flat fastening portion 175 offset laterally from portion 174, forming the shoulder portion 176. Fastening portion 175 of the particular pulley cup shown is provided with radially spaced bolt holes 177 and a center hole 178.

A preferred mode of operation of the embodiment of the apparatus of the present invention for forming the blank pulley cup 167 into a finished pulley, generally indicated at 179 in Fig. 13, is shown in Figs. 5, 7, 8 and 9 and described hereafter. It is preferred in the particular embodiment shown that the helical garter spring 82, received in and surrounding the segments 60 and 61 of the mandrel assembly 57, not be of sufficient strength and size to resist the centrifugal force of the segments 60 and 61, when the headstock die 41 and consequently the mandrel 57 are rotating at the rotational speed at which the finished pulley 179 is formed.

This is obviously a matter of choice and as before described, the apparatus shown in the present particular embodiment is operable with either a spring strong enough to resist the contrifugal force of segments 60 and 61 or with a spring that is not of sufficient strength to resist such centrifugal force. When, however, spring 82 is not of sufficient strength to resist the centrifugal force, it is preferred to provide the spinning machine 20 with the combination brake and clutch 22 on the drive motor 21, as shown in Fig. 1 and before described, since the rotation of the spindle 25 must be halted at the end of each pulley spinning cycle to be hereinafter described.

As shown in Fig. 5, the spindle 25 is at rest or not rotating, and therefore the headstock die 41 and the mandrel 57 are at rest. Further, the mandrel segment support assembly 87 is in retracted position so that the large diameter portion 90 of assembly 87 is axially spaced from the pilot members 72 of mandrel 57.

Thus, without any centrifugal force operating on segments 60 and 61 of mandrel 57 and without any support from support assembly 87, the garter spring 82 retains segments 60 and 61 in their collapsed or innermost radial position. Also, at this stage of operation of the apparatus, the ring 50 surrounding the headstock die 41 is urged axially toward the tailstock die 98 by the pins 55 and the helical springs 56, so that the shoulder 52 of ring 50 abuts the shoulder 47a of headstock die 41, and so that the annular surface 51 of ring 50 overhangs the groove-forming surface 49 of die 41, as shown.

The blank pulley cup 167 is then placed in operable position between the headstock die 41 and the tailstock die 98, and the power means is applied to move the tailsock die 98 axially towards the headstock die 41 so that the pulley cup 167 is retained therebetween. In this position, the open end 169 of the pulley cup 167 is engaged beneath the overhanging surface 51 of ring 50 and abutting the groove-forming surface 49 on the headstock die 41, as shown in Fig. 7. Also, the closed end 170 of pulley cup 167 abuts the groove-forming surface 102 of tailstock die 98 and the groove-forming surface 102 abuts the double flange groove portion 174, with the shoulder portion 176 of pulley cup 167 abutting the shoulder portion 101a of die 98, and with fastening portion 175 of pulley cup 167 received in large diameter bore 102a of die 98.

As seen in Fig. 7, the center hole 178 of the pulley cup 167 is preferably of substantially the same diameter as the smaller diameter bore 99a of tailstock die 98 and as before described, bore 99a is preferably a diameter equal to the diameter of bore 59 in mandrel 57.

With pulley cup 167 thus positioned, the power actuated means is brought into operation moving the shaft 88, the small diameter portion 89 and the large diameter portion 90 of the mandrel segment support assembly 87 to move axially towards the tailstock die 98 so that the tapered cam surfaces 92 on the large diameter portion 90, underlies the cam surfaces 73 and 74 formed on the pilot members 72 of the mandrel 57 forcing pilot members 72 radially outwardly and thereby forcing segments 60 and 61 into expanded position. With segments 60 and 61 in expanded position, the end of the large diameter portion 90 of assembly 87 is received through the center hole 178 of pulley cup 167 and within the small diameter bore 99a of die 98.

Thereafter, the drive motor 21 of spinning machine 20 is started, driving clutch 22, which in turn rotates headstock spindle 25 as before described. Rotation of spindle 25 rotates headstock die 41 and mandrel 57 causing centrifugal force to act on segments 60 and 61 of mandrel 57 forcing these segments further radially outwardly against the inner surface 173 of pulley cup 167, as shown in Fig. 7.

At this point in the operation, the roughing roll assembly 103 and the finishing roll assembly 148 are retracted a distance radially away from headstock die 41, tailstock die 98 and pulley cup 167. Further, the rotation of the headstock die 41 causes rotation of the blank pulley cup 167 and the tailstock die 98 so that dies 41 and 98, pulley cup 167 and mandrel 57 are all rotating in unison.

Next the apparatus 28 of the spinning machine 20 is brought into operation moving the roughing roll assembly 103 radially inwardly towards the dies 41 and 98, and pulley cup 167, so that the groove-forming surfaces 129 and 146 of roughing rolls 107 and 108 are in contact with the outer surface 172 of the axial flange 168 of the pulley cup 167. At this moment of the operation, the roughing rolls 107 and 108 are at their maximum distance apart in the position shown in Fig. 7 just engaging pulley cup 167 and the frictional contact between the roughing rolls 107 and 108 and the pulley cup 167 causes these rolls to rotate.

As the roughing roll assembly 103 continues its radially inward movement, the groove-forming surfaces 129 and 146 of rolls 107 and 108 begin to form the rough grooves in the axial flange 168 of the pulley cup 167, exerting radial pressure on axial flange 168. This radial pressure causes the inner side 173 of flange 168 to bear against the segments 60 and 61 of mandrel 57, forcing segments 60 and 61 a slight distance radially inwardly until the cam surfaces 74 on members 72 abut and are supported by the outer circumferential surface of large diameter portion 90 of mandrel segment support assembly 87, in the position as shown in Fig. 7.

As the roughing rolls 107 and 108 continue to move radially inwardly, forming the rough grooves in the pulley cup 167, the total axial length of the axial flange 168 of pulley cup 167 is reduced, with the means moving the tailstock die 98 axially towards the headstock die 41 continuing to exert pressure against the tailstock die 98. This causes die 98 to move the double flange portion 174 and the fastening portion 175 of pulley cup 167 axially towards the headstock die 41. It is this combination of axial pressure by the tailstock die 98 and the radial pressure by the roughing rolls 107 and 108 that forms the rough grooves in the pulley cup 167.

As these rough grooves are formed, the axially movable roll 108 is forced towards the stationary roll 107, and also the working surfaces 70 and 78 of the segments 60 and 61 are forced axially towards the groove-forming surface 49 on die 41 thereby causing the support member 58 of mandrel 57 to telescope further in the headstock die 41.

As shown in Fig. 8, the final rough grooves are formed as at 180 and 181. At this point in the operation, the roughing roll 108 has moved axially so that it preferably abuts the roughing roll 107. Further the side of roll 107 has engaged ring 50 and moved it a slight distance axially towards flange 39 of adapter 34, but with ring 50 still confining the open end 169 of the pulley cup 167. Also, the tailstock die 98 is still spaced from the support member 58 of mandrel 57 so that the fastening portion 175 of pulley cup 167 is still also spaced from support member 58, with the large diameter portion 90 of mandrel segment support assembly 87 telescoped a greater distance axially within tailstock die 98.

Next the roughing roll assembly 103 is moved radially away from the dies 41 and 98, and the pulley cup 167, so that the groove-forming surfaces 129 and 146 of roughing rolls 107 and 108 are no longer engaged with the rough grooves 180 and 181. Thereafter, the finishing roll assembly 148 is moved radially towards the dies 41 and 98, and pulley cup 167, at which time the finishing rolls 152 and 153 are in the position relative to each other, as shown in Fig. 4, that is, with the axially movable finishing roll 153 at its maximum distance axially from axially stationary roll 152. As the finishing roll assembly 148 continues its radially inward movement, the groove-forming surfaces 161 and 162 of finishing rolls 152 and 153 begin to engage the rough grooves 180 and 181, causing the rolls to rotate and causing the axially movable finishing roll 153 to move axially towards the finishing roll 152.

The forming of the finished grooves is in much the same manner as the before-described forming of the rough grooves in the pulley cup 167, that is, with the tailstock die 98 continuing to exert axial pressure and continuing to move fastening portion 175 of pulley cup 167 towards the support member 58 of mandrel 57. Further the finishing roll 153 moves closer to the finishing roll 152, while the segments 60 and 61 of mandrel 57 move closer to the groove-forming surface 49 on headstock die 41. At the end of the finished groove-forming operation, the various parts of the apparatus are in the positions shown in Fig. 9.

As shown in Fig. 9, the tailstock die 98 has forced the fastening portion 175 of pulley cup 167 to telescope over the support member 58 of the mandrel 57, thus tightly clamping the fastening portion 175 between die 98 and mandrel 57. The support member 58 of mandrel 57 has bottomed in bore 45 of headstock die 41 and the shoulder 63 of member 58 is abutting the shoulder portion 46 of die 41. Further, the finishing rolls 152 and 153 are in abutting position and have formed the finish grooves, as indicated at 182 and 183.

At the latter portion of the finished groove-forming cycle, the shoulder portion 165 on finishing roll 152 engages the angled surface 54 of ring 50, moving ring 50 axially towards the flange 39 of adapter 34, with shoulder portion 165 retaining the open end 169 of pulley cup 167 confined, as shown, and slightly ironing this open end 169. Also, the shoulder portions 163 and 164 of finishing rolls 152 and 153 respectively, form an unbroken axial surface between the groove-forming surfaces 161 and 162 of rolls 152 and 153 since these rolls are in abutting position, so that shoulder portions 163 and 164 confine the connecting portion, indicated at 184 in Fig. 9, of the pulley cup 167 and also slightly iron and form this connecting portion 184.

Still further, at the last stage of the finished groove-forming cycle, the groove-forming surfaces 161 and 162 of the finishing rolls 152 and 153 iron the finished grooves 182 and 183 between the groove-forming surface 49 of headstock die 41 and the working surfaces 70 and 78 of the segments 60 and 61, and between the working surfaces 70 and 78 of the segments 60 and 61 and the groove-forming surface 102 of tailstock die 98. In this way the finished grooves 182 and 183 are provided with uniformly smooth and polished surfaces, resulting in the finished pulley 179, as shown in Fig. 13.

At the end of the above described finished groove-forming cycle, the finishing roll assembly 148 is moved radially away from the headstock die 41 and the tailstock die 98, and the power to the drive motor 21 is cut off which results in an immediate disengagement of the clutch portion of brake and clutch 22 and an immediate engagement of the brake portion thereof. With drive motor 21 disconnected and the brake of brake and clutch 22 engaged, the dies 41 and 98, the mandrel 57 and the finished pulley 179 are stopped very quickly by the action of the brake on the spindle 25 through the belt 26.

Also, at this moment, the power means causing the axial movement of the mandrel segment support assembly 87 moves the shaft 88 and portions 89 and 90 of assembly 87 axially away from the tailstock die 98. Thus, as the mandrel 57 comes to rest, the garter spring 82 forces the segments 60 and 61 into retracted position or in a position shown in Fig. 5, with the cam surfaces 73 of members 72 in contact with each other, thereby disengaging the segments 60 and 61 from the finished pulley 179.

Thereafter, the headstock die 41 and tailstock die 98 are separated by means of the power means moving the tailstock die 98 axially away from the headstock die 41, and the finished pulley 179 is removed. The apparatus is then ready for the reception of another blank pulley cup 167 and the various spinning operations again repeated.

In Figs. 10 and 11 are illustrated a second embodiment of the internal collapsible mandrel assembly. As shown in Fig. 10, the headstock die 185 is of somewhat different configuration to accommodate the different type of mandrel assembly, with die 185 being provided with an end surface 186, a large diameter bore 187 and a small diameter bore 188.

The mandrel assembly, generally indicated at 189, includes identical collapsible segments 190 having outer circumferential arcuate surfaces 191, inner arcuate cam surfaces 192 and side working surfaces 193. Segments 190 are also provided with axially extending radial slots 194 which are engaged by spring pins 195 and stop pins 196.

Spring pins 195 are received through the headstock die 185 and are provided with surrounding helical springs, not shown, urging pins 195 axially towards the tailstock die, not shown. Stop pins 196 are also received axially through the headstock die 185 and are provided with a shoulder 197, as shown. Pins 195 and 196 are received through slots 194 and are threadably engaged in a radially extending annular ring 198.

Segments 190 are further provided with shoulder portions 199 extending axially towards the tailstock die, not shown, and shoulder portions 200 extending axially towards the headstock die 185, with both of these shoulder portions being of a diameter equal to the large diameter bore 187 of the headstock die 185 when segments 190 are in expanded position. Shoulder portions 199 and 200 are each provided with a preferably arcuate circumferentially extending spring retaining grooves 201 and 202 respectively, in which are received the preferably helical garter springs 203 and 204.

The mandrel segment support assembly, generally indicated at 205, in this case, is merely comprised of a solid cylindrical shaft, the end of which is preferably conical or pointed (not shown). Support assembly 205 is also preferably provided with means for moving this assembly axially toward or away from the tailstock die of the apparatus to engage or disengage the cam surfaces 192 of the segments 190. Further, it is also preferable to form the cam surfaces 192 angled or tapered outwardly, as at 206, for easier reception of the mandrel segment support assembly 205.

When the segments 190 are in their retracted position, these various segments are in abutting relation to each other, as shown in dotted lines in Fig. 11. When segments 190 are in expanded position and the mandrel segment support assembly 205 is in place, the shoulder portions 200 are engaged by the large diameter bore 187 of the headstock die 185, as shown, thus limiting radial outward movement of segments 190 but with segments 190 axially slidable of bore 187. When this limiting means is used, that is, shoulder portions 200 abutting bore 187, the radial outward movement of segments 190 may be limited so that the outer surfaces 191 and the working surfaces 193 are spaced radially inwardly from the inner surface of the pulley cup flange before the grooves are formed.

The spring pins 195 normally urge the ring 198 axially towards the tailstock die of the apparatus, thereby moving the stop pins 196 axially, causing the shoulder 197 to engage the segments 190 and move these segments axially similar to the axial floating movement of the mandrel assembly shown in the first embodiment. When, however, the various roughing and finishing rolls exert pressure against the working surfaces 193 moving the segments 190 axially towards the headstock die 185, shoulder portion 200 telescopes further within the large diameter bore 187 of die 185 and the segments 190 eventually abut the end surface 186 of die 185, as shown in Fig. 10.

It may be noted that the width between the working surfaces 193 of segments 190 of mandrel assembly 189, illustrated in the second embodiment, is less than the width between the working surfaces 70 and 78 of the segments 60 and 61 shown in the mandrel assembly 57 in the first embodiment. Thus, with the mandrel assembly 189 shown in the second embodiment, the finished pulley 207, shown in Fig. 15, may be formed. This width between the working surfaces 193 of segments 190 could however be equal to the width between the working surfaces 70 and 78 in the mandrel assembly 57 or any other desired width to form the configuration of pulley desired. The only difference between the finished pulley 207 shown in Fig. 15, and the finished pulley 179 shown in Fig. 13, is that the connecting portion 208 between the finished grooves 209 and 210 of pulley 207 extends a lesser distance axially than the connecting portion 184 of pulley 179. This smaller connecting portion 208 merely serves to provide a lesser distance axially between the finished grooves 209 and 210.

It should be understood that the particular embodiments of the apparatus shown in the drawings and described herein are merely illustrative of the principles of the present invention, with these various embodiments being designed specifically for forming the particular finished pulleys 179 and 207, shown in Figs. 13 and 15. Numerous changes, however, may be made in the apparatus for forming two or more grooves in a cylindrical or stepped cylindrical contiguous flange of various designs and configurations of pulley cups to provide various designs and configuraitons of finished pulleys.

For instance, the grooves could be spaced axially from either one or both of the ends of the pulley cup, in which case, it would not be necessary to provide groove-forming surfaces on either the headstock or the tailstock die, but it would be necessary to provide additional side working surfaces on the collapsible segments of the mandrel or even additional rings of segments in order to provide working surfaces supporting each side of each groove to be formed. Additionally, the pulley cup could be provided with various flanges at different radial distances from the axis of the pulley cup with one or more parallel grooves being forming in each of these flange portions, in which case, the construction of the roughing and finishing rolls would be changed as well as the construction of the headstock die, tailstock die and internal collapsible mandrel.

Still further, different configurations of pulley cups would change the construction of the headstock and tailstock dies in order that these dies may properly retain the pulley cup for the groove-forming operations. For instance, the blank pulley cup may have a hub member affixed centrally therein or the flange portion of the pulley cup may have various shoulder portions different from those shown. It should be understood that all of these and other obvious changes for adapting the apparatus for forming various types of multi-groove pulleys may be made without departing from the principles of the present invention.

One of the principal advantages of the present invention is that it is possible to form a series of spaced parallel grooves in a pulley cup with these grooves having extremely close concentricity and uniform groove widths. This advantageous feature is provided by the fact that the grooves are roller formed in the pulley cup, while the pulley cup is being rotated about its axis at a high rate of speed.

Further, the various spaced parallel grooves are provided with a smooth and work-hardened groove surface. This is possible again because rotatable rolls form the grooves in the pulley cup and iron these grooves against groove-forming surfaces on the various dies and on an internal collapsing mandrel.

Thus, the present invention provides apparatus for forming multi-groove pulleys which overcomes the difficulties of prior constructions as hereinbefore discussed; with which it is possible to form a one-piece multi-groove pulley with extremely close concentricity and uniform groove widths; with which it is possible to form a one-piece multi-groove pulley having grooves that are formed and ironed by rotatable rolls giving smooth and work-hardened groove surfaces; with which all grooves of the pulley have each of the various operations performed thereon at the same time; in which an internal collapsible mandrel supports portions of the undersides of the grooves during the forming of the grooves, thereby providing uniform smooth and work-hardened groove surfaces; in which the rolls forming the various grooves float axially in reference to each other and the internal mandrel floats axially as the grooves are being formed, thereby providing exactly located uniform width perfectly concentric grooves; and which performs all of the above operations in an efficient and economical manner yet is much less expensive than prior constructions of apparatus for forming multi-groove pulleys.

In the foregoing description, certain terms have been used for brevity, clearness and understanding, but no unnecessary limitations are to be implied therefrom, because such words are used for descriptive purposes herein, and are intended to be broadly construed.

Moreover the embodiments of the improved construction illustrated and described herein are by way of example, and the scope of the present invention is not limited to the exact details of the construction shown.

Having now described the invention, the construction, operation and use of preferred embodiments thereof, and the advantageous new and useful results obtained thereby; the new and useful construction and reasonable mechanical equivalents thereof, obvious to those skilled in the art, are set forth in the appended claims.

We claim:

1. In apparatus for roller forming a series of parallel generally V-shaped cross-section grooves in a contiguous flange wall of an open ended cup-shaped blank, said cup having a predetermined uniform axial flange length with inner and outer sides, including opposed rotatable headstock and tailstock dies having opposed annular groove-forming surfaces, a first and second spindle, one of said spindles having an opening formed axially therethrough, driving means rotating at least one of said spindles, the headstock and tailstock dies being mounted on said spindles and rotatable therewith, means axially moving one of said spindles to move one of said dies toward and away from the other and exerting axial pressure on the cup-shaped blank while the grooves are being formed, a mandrel mounted on one of said dies for rotation therewith and having axial movement in reference thereto, stop means connecting said mandrel and said one die limiting the axial movement of the mandrel in reference to said one die in one direction, resilient means urging said mandrel to move axially in reference to said one die in said one direction, a plurality of segments mounted in said mandrel for movement radially between collapsed and expanded positions, the segments having inner portions and outer portions, working surfaces formed on the outer portions of the segments supporting the underside of portions of the groove surfaces while the grooves are being formed, cam surfaces on the inner portions of the segments, a garter spring engaged with and encircling portions of the segments for opposing radial movement of said segments, an axially movable cylindrical support member selectively engageable with said cam means on said segments supporting the segments in expanded position and preventing movement of the segments to collapsed position while the grooves are being formed in the cup-shaped blank, an actuating shaft connected to said support member and received in said opening in said one spindle, cylinder means selectively axially reciprocating said shaft in reference to said one spindle, a roughing roll assembly, a finishing roll assembly, said roll assemblies mounted at opposite sides of the axis of said dies and mandrel, each of said assemblies including at least one rotatably mounted roll for each groove to be formed in the cup-shaped blank, there being at least one groove-forming surface formed on each of said roughing and finishing rolls for each groove to be formed in the cup-shaped blank, at least certain of the rolls of each of said assemblies movable axially in reference to the other rolls of each said assembly, resilient means in each of said assemblies urging said axially movable rolls away from said other rolls, stop means in each of said assemblies limiting said axial movement of said axially movable rolls and causing all of the rolls of each said assembly to rotate together, the roughing and finishing roll groove-forming surfaces cooperating with the die groove-forming surfaces and the mandrel working surfaces during rotation of the dies and movement of the rolls toward the die and mandrel to simultaneously form a plurality of grooves in the contiguous flange wall of the cup-shaped blank, a ring mounted on one of said dies rotatable therewith and axially movable in relation thereto, said ring normally circumferentially overhanging the annular groove-forming surface on said one die, and means normally urging said ring axially in one direction relative to said one die to a position to at least be engaged by the finishing roll assembly and moved thereby axially in the other direction relative to said one die.

2. Apparatus for roller forming a series of parallel grooves in a contiguous flange wall of a cup-shaped blank having inner and outer flange wall sides, including axially opposed rotatable headstock and tailstock dies for holding and rotating a cup-shaped blank, said dies having opposed annular groove-forming surfaces, driving means rotating at least one of said dies, mandrel means for supporting certain portions of the inner flange wall sides during selected groove-forming intervals, roll means mounted for movement toward and away from the axis of rotation of the die means and a cup-shaped blank held thereon, groove-forming surfaces on the roll means, there being at least one groove-forming surface on the roll means for each groove to be formed in the cup-shaped blank, the roll means groove-forming surfaces cooperating with the dies and the mandrel means during rotation of the dies and movement of the roll means toward the dies and the mandrel means to simultaneously form a plurality of grooves in the contiguous flange wall of the cup-shaped blank, means for axially moving one of said dies toward and away from the other and exerting axial pressure on the cup-shaped blank while the grooves are being formed, said mandrel means including a plurality of segments movable radially between a collapsed and expanded position, the segments having inner portions and outer portions, annular segmental working surfaces formed on the outer portions of the segments to support the underside of portions of the groove surfaces while the grooves are being formed, cam means formed on the inner portions of the segments, resilient means engaging the segments opposing radial movement of the segments, support means selectively engageable with the segment cam surfaces supporting said segments in expanded position and preventing radial movement of said segments to collapsed position while the grooves are being formed in the cup-shaped blank, means connecting said mandrel means to one of said dies for rotation therewith and for axial movement in reference thereto between a position with the mandrel working surfaces a lesser distance from said one die groove-forming surface to a position with the mandrel working surfaces a greater distance from said one die groove-forming surface, and said connecting means including stop means limiting said axial movement of the mandrel working surfaces away from said one die groove-forming surface and resilient means urging said mandrel working surfaces axially away from said one die groove-forming surface.

3. Apparatus for roller forming a series of parallel grooves in a contiguous flange wall of a cup-shaped blank having inner and outer flange wall sides, including axially opposed rotatable headstock and tailstock dies for holding and rotating a cup-shaped blank, said dies having opposed annular groove-forming surfaces, driving means rotating at least one of said dies, means axially moving one of said dies toward and away from the other and exerting axial pressure on the cup-shaped blank while the grooves are being formed therein, mandrel means for supporting certain portions of the inner flange wall sides during selected groove-forming intervals, said mandrel means including a plurality of segments, means mounting the segments for movement radially between a collapsed and expanded position, the segments having inner portions and outer portions, annular segmental working surfaces formed on the outer portions of the segments supporting the underside of portions of the groove surfaces while the grooves are being formed, cam means formed on the inner portions of the segments, resilient means engaging the segments opposing radial movement of the segments, support means selectively engageable with the segment cam surfaces supporting said segments in expanded position and preventing radial movement of said segments to collapsed position while the grooves are being formed in the cup-shaped blank, means connecting said mandrel means to one of said dies for rotation therewith and for axial movement in reference thereto between a position with the mandrel working surfaces a lesser distance from said one die groove-forming surface to a position with the mandrel working surfaces a greater distance from said one die groove-forming surface, said connecting means including stop means limiting said axial movement of the mandrel working surfaces away from said one die groove-forming surface and resilient means urging said mandrel working surfaces axially away from said one die groove-forming surface, roll means mounted for movement toward and away from the axis of rotation of the die means and a cup-shaped blank held thereon, said roll means including a roughing roll assembly and a finishing roll assembly mounted at opposite sides of the axis of the die means and mandrel means, each of said assemblies including at least one rotatably mounted roll for each groove to be formed in the cup-shaped blank, there being at least one groove-forming surface formed on each of said roughing and finishing rolls for each groove to be formed in the cup-shaped blank, at least certain of the rolls of each of said assemblies movable axially in reference to the other rolls of said each assembly, resilient means in each of said assemblies urging said axially movable rolls away from said other rolls, stop means in each of said assemblies limiting said axial movement of said axial movable rolls and causing all of the rolls to rotate together, and the roll means groove-forming surfaces cooperating with the dies and the mandrel means during rotation of the dies and movement of the roll means toward the dies and the mandrel means to simultaneously form a plurality of grooves in the contiguous flange wall of the cup-shaped blank.

4. Apparatus for roller forming a groove in a flange wall of a cup-shaped blank having inner and outer flange wall sides, including rotatable die means for holding and rotating a cup-shaped blank, mandrel means for supporting certain portions of the inner flange wall sides during selected groove-forming intervals, means mounting the mandrel means for movement axially of the die means, roll means mounted for movement toward and away from the axis of rotation of the die means and a cup-shaped blank held thereon, groove-forming surfaces on the roll means, the roll means groove-forming surfaces cooperating with the die and mandrel means during rotation of the die means and movement of the roll means toward the die and mandrel means to form a groove in the flange wall of the cup-shaped blank, the mandrel means including a plurality of segments, means mounting the segments for movement radially between a collapsed and expanded position, and annular segmental working surfaces formed on the outer portions of the segments supporting the underside of portions of the groove surfaces while the groove is being formed.

5. Apparatus for roller forming a groove in a flange wall of a cup-shaped blank having inner and outer flange wall sides, including axially opposed rotatable headstock and tailstock dies for holding and rotating a cup-shaped blank, driving means rotating at least one of said dies, means for axially moving one of said dies toward and away from the other and exerting axial pressure on the cup-shaped blank while the groove is being formed, mandrel means for supporting certain portions of the inner flange wall sides during selected groove-forming intervals, means connecting said mandrel means to at least one of said dies for rotation therewith and for axial movement in reference thereto, said connecting means including resilient means urging said mandrel means away from said one die and stop means limiting axial movement of said mandrel means away from said die, roll means mounted for movement toward and away from the axis of rotation of the dies and a cup-shaped blank held thereon, groove-forming surfaces on the roll means, the roll means groove-forming surfaces cooperating with the dies and the mandrel means during rotation of the dies and movement of the roll means toward the dies and the mandrel means to form a groove in the flange wall of the cup-shaped blank, the mandrel means including a plurality of segments, and means mounting the segments for movement radially between a collapsed and expanded position, and annular segmental working surfaces formed on outer portions of the segments supporting the underside of portions of the groove surfaces while the groove is being formed.

6. Apparatus for roller forming a series of parallel grooves generally V-shaped in cross section in a contiguous flange wall of an open ended cup-shaped blank, having a predetermined uniform axial flange length having inner and outer sides, including rotatable die means for holding and rotating a cup-shaped blank, mandrel means for supporting certain portions of the inner flange wall sides during selected groove-forming intervals, said mandrel means including a plurality of segments movable radially between a collapsed and expanded position, the segments having inner portions and outer portions, annular segmental working surfaces formed on the outer portions to support the undersides of portions of the groove surfaces while the grooves are being formed, cam surfaces formed on the inner portions of the segments, resilient means engaging the segments opposing radial movement of the segments, support means selectively engageable with the segment cam surfaces supporting said segments in expanded position and preventing moving of said segments to collapsed position while the grooves are being formed in the cup-shaped blank, roll means mounted for movement toward and away from the axis of rotation of the die means and a cup-shaped blank, groove-forming surfaces on the roll means, there being at least one groove-forming surface on the roll means for each groove to be formed in the cup-shaped blank, the roll means groove-forming surfaces cooperating with the die and mandrel means during rotation of the die means and movement of the roll means toward the die and mandrel means to simultaneously form a plurality of grooves in the contiguous flange wall of the cup-shaped blank, ring means mounted for axial movement on said die means for rotation therewith, said ring means radially confining the open end of the cup-shaped blank during at least a portion of the groove-forming operation, and means normally urging said ring means axially in one direction relative to said die means to a position to be engaged by said roll means and moved thereby axially in the other direction relative to said die means.

7. Apparatus for roller forming a series of parallel grooves having generally radially extending side walls and minimum diameters in a contiguous flange wall of a cup-shaped blank having inner and outer flange wall sides, including axially opposed rotatable headstock and tailstock dies for holding and rotating a cup-shaped blank, said dies having axially opposed groove-forming surfaces, means for rotating at least one of the headstock and tailstock dies, collapsible mandrel means movable between a collapsed and expanded position mounted axially between the headstock and tailstock dies for supporting in expanded position certain portions of the inner flange wall sides during selected groove-forming intervals, the mandrel means having groove-forming surfaces at least at a side axially opposed to and generally axially aligned with the headstock die groove-forming surfaces and at a side axially opposed to and generally axially aligned with the tailstock die groove-forming surfaces, said headstock and tailstock die groove-forming surfaces and mandrel means groove-forming surfaces being positioned supporting the inner flange wall side during said selected groove-forming intervals at least at certain portions of each of the groove side walls and radially outward of the groove minimum diameters, roll means mounted for movement toward and away from the axis of rotation of the headstock and tailstock dies and the cup-shaped blank held thereon, groove-forming surfaces on the roll means, the roll means groove-forming surfaces co-operating with and being movable axially between the axially opposed headstock and tailstock die groove-forming surfaces and mandrel means groove-forming surfaces during rotation of the headstock and tailstock dies and movement of the roll means toward the dies and mandrel means to form the grooves in the flange wall of the cup-shaped blank, and means for collapsing the mandrel means to a collapsed position diameter less than the minimum diameters of the grooves after the grooves have been formed, whereby at least one groove is formed between the headstock die and mandrel means groove-forming surfaces and at least one groove is formed between the tailstock die and mandrel means groove-forming surfaces, and the completed pulley may be removed axially from the mandrel means after the collapse of said mandrel means.

8. Apparatus for roller forming a series of parallel and adjacent grooves having bottom portions and minimum diameters in a flange wall of a cup-shaped blank having inner and outer flange wall sides, including axially opposed rotatable headstock and tailstock dies for holding and rotating a cup-shaped blank, means for rotating at least one of said headstock and tailstock dies, collapsible mandrel means movable between a collapsed and expanded position mounted axially between the headstock and tailstock dies for supporting certain portions of the inner flange wall sides during selected groove-forming intervals, groove-forming surfaces on the mandrel means positioned radially outward of the finished groove minimum diameters when the mandrel means is in expanded position, the mandrel means having a maximum diameter less than the finished groove minimum diameters when in collapsed position, means for moving the mandrel means between its collapsed and expanded positions, roll means mounted for movement toward and away from the axis of rotation of the dies and the cup-shaped blank held thereon, groove-forming surfaces on the roll means, the roll means groove-forming surfaces being positioned for co-operating with the mandrel means groove-forming surfaces and the headstock and tailstock dies during rotation of the dies and movement of the roll means toward the mandrel means and dies to form the grooves in the flange wall of the cup-shaped blank, and the groove-forming surfaces of the mandrel means being positioned to support at least portions of the inner flange wall sides at least between bottom portions of adjacent grooves and radially outward of the groove minimum diameters when the mandrel means is in expanded position; whereby the grooves are formed at least partially against the mandrel means groove-forming surfaces which support between bottom portions of adjacent grooves outward of the groove minimum diameters, and the mandrel means may be collapsed for removal of the completed pulley.

9. Apparatus for roller forming a series of parallel and adjacent grooves having bottom portions and minimum diameters in a flange wall of a cup-shaped blank having inner and outer flange wall sides, including axially opposed rotatable headstock and tailstock dies for holding and rotating a cup-shaped blank, means for rotating at least one of said headstock and tailstock dies, means for moving at least one of said headstock and tailstock dies axially relative to the other of said headstock and tailstock dies, collapsible mandrel means movable between a collapsed and expanded position mounted axially between the headstock and tailstock dies for supporting certain portions of the inner flange wall sides during selected groove-forming intervals, groove-forming surfaces on portions of the mandrel means positioned radially outward of the finished groove minimum diameters when the mandrel means is in expanded position, the mandrel means having a maximum diameter less than the finished groove minimum diameters when in collapsed position, means for moving the mandrel means between its collapsed and expanded positions, means mounting at least the portions of the mandrel means having the groove-forming surfaces formed thereon for axial movement, roll means mounted for axial movement and movement toward and away from the axis of rotation of the dies and the cup-shaped blank held thereon, groove-forming surfaces on the roll means, the roll means groove-forming surfaces being positioned for co-operating with the mandrel means groove-forming surfaces and the headstock and tailstock dies during rotation of the dies and movement of the roll means toward the mandrel means and dies to form the grooves in the flange wall of the cup-shaped blank, and the groove-forming surfaces of the mandrel means being positioned to support at least portions of the inner flange wall sides at least between bottom portions of adjacent grooves and radially outward of the groove minimum diameters when the mandrel means is in expanded position; whereby the grooves are formed at least partially against the mandrel means groove-forming surfaces which support between bottom portions of adjacent grooves outward of the groove minimum diameters, and the mandrel means may be collapsed for removal of the completed pulley.

References Cited in the file of this patent

UNITED STATES PATENTS

| | | |
|---|---|---|
| 1,856,151 | Bloss et al. | May 3, 1932 |
| 2,061,501 | Brown | Nov. 17, 1936 |
| 2,062,415 | Harrison | Dec. 1, 1936 |
| 2,089,476 | Grotner | Aug. 10, 1937 |
| 2,313,748 | Hothersall | Mar. 16, 1943 |
| 2,567,334 | Harrison | Sept. 11, 1951 |
| 2,684,103 | Lee et al. | July 20, 1954 |
| 2,685,856 | Wickwire et al. | Aug. 10, 1954 |